July 23, 1957 R. E. BUSCH ET AL 2,800,074
IMPRINTING CONTROL MECHANISM IN LISTING MACHINES
Original Filed Feb. 2, 1953 5 Sheets-Sheet 1

INVENTORS,
Richard E. Busch
& Bryan F. Kuhne
BY
ATTORNEY.

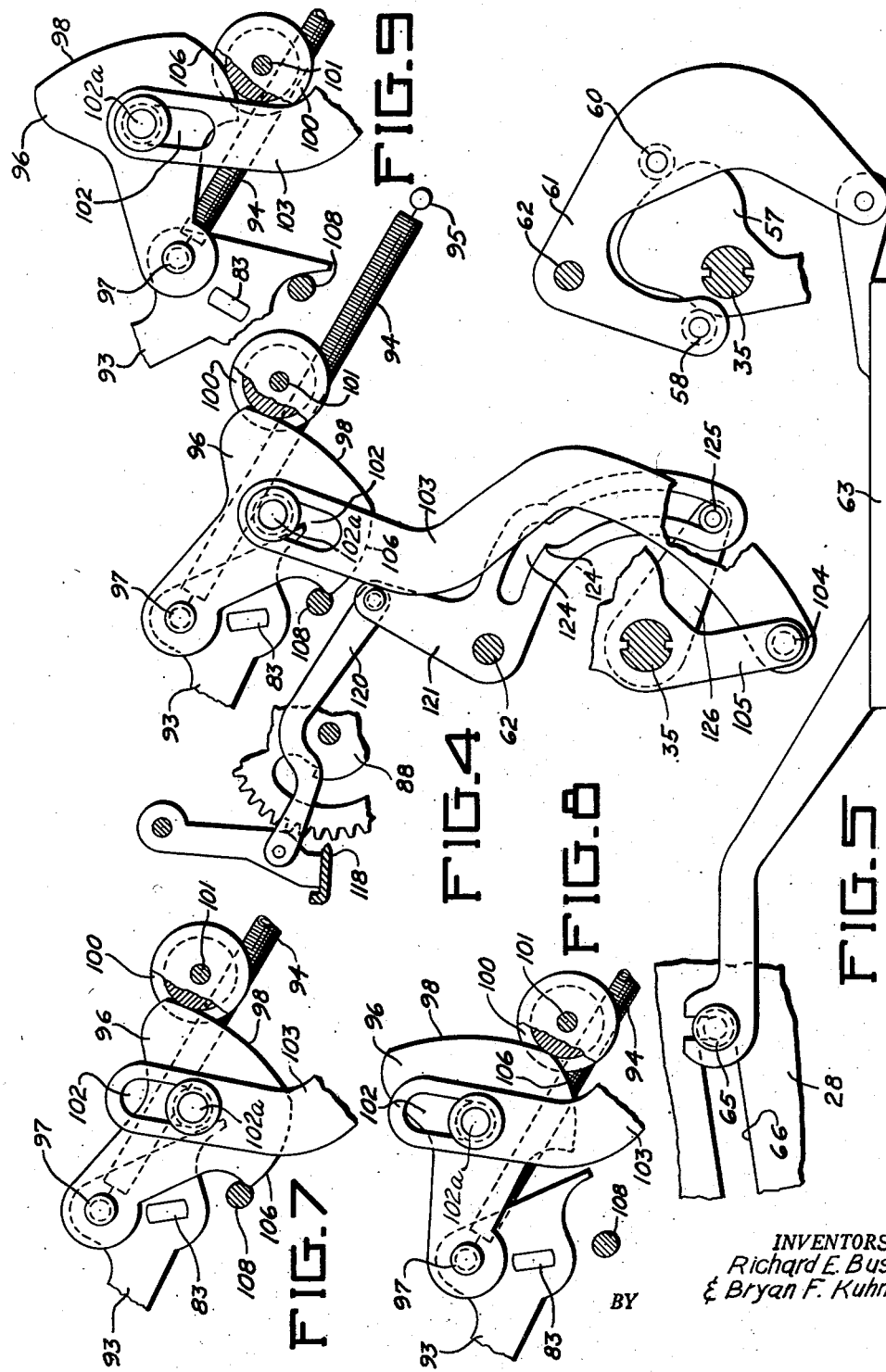

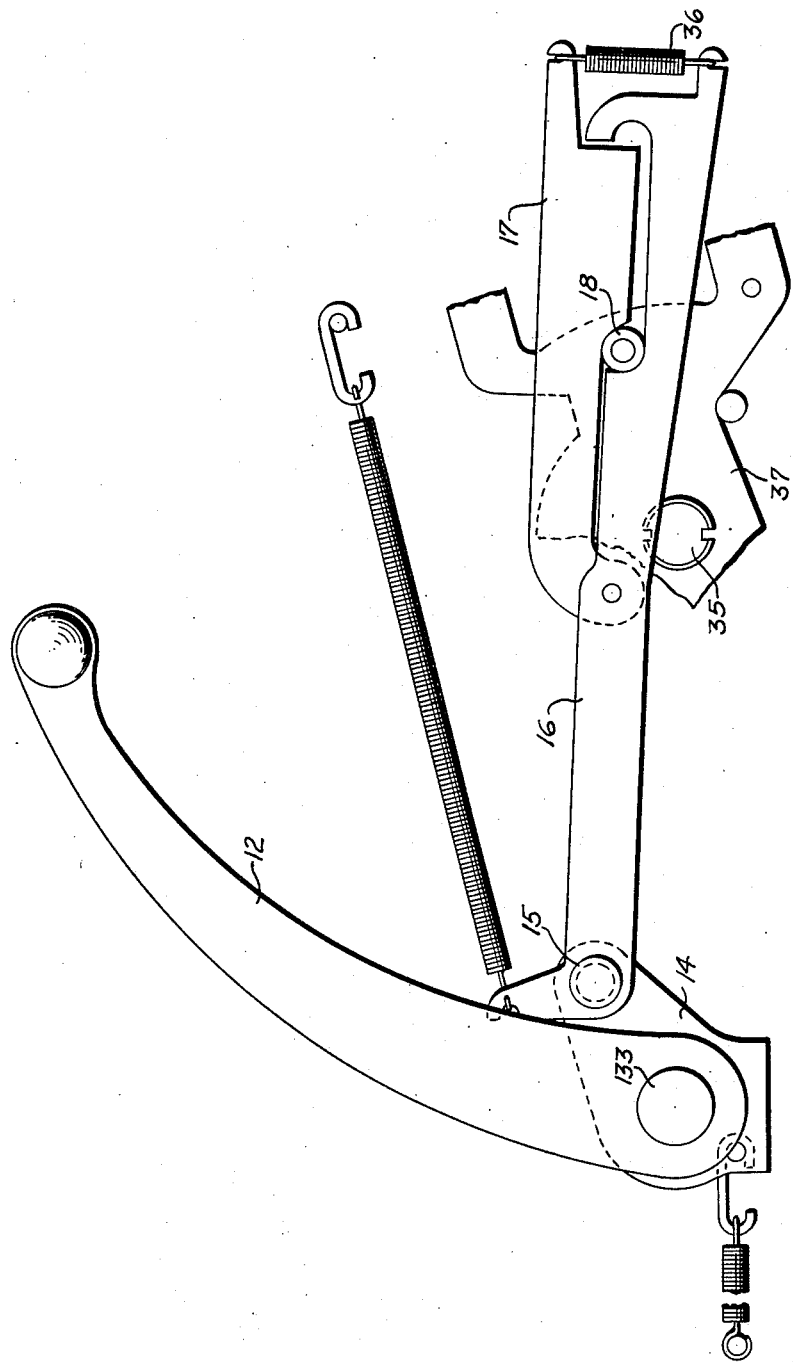

United States Patent Office 2,800,074
Patented July 23, 1957

2,800,074

IMPRINTING CONTROL MECHANISM IN LISTING MACHINES

Richard E. Busch, North Hollywood, and Bryan F. Kuhne, Duarte, Calif., assignors to Clary Corporation, a corporation of California Original application February 2, 1953, Serial No. 334,632, now Patent No. 2,744,682, dated May 8, 1956. Divided and this application July 12, 1954, Serial No. 442,522

4 Claims. (Cl. 101—96)

This invention relates to calculating machines and has particular reference to such machines commonly known as listing machines which are capable of calculating and recording the factors and results of such calculations. However, it is to be understood that the invention may be applicable to other forms of business machines.

In a machine of the above type in which an oscillating drive mechanism is employed, such as a manually operable oscillating handle and interconnected mechanism, the timing of the functions or operating phases of the machine during the return stroke of the operating mechanism is normally controlled or restricted by the timing of functions occurring during the forward stroke. That is, if a particular portion of the machine cycle allotted to a particular function occurs during the forward stroke, the same portion of the cycle would generally be allotted to some function or an idle phase during the return stroke.

Various devices have been proposed and used heretofore to shift the timing phases of certain operations occurring during the return stroke from the corresponding or mirror phases occurring during the forward stroke.

An example of such phase changing devices is a printer control mechanism associated with an oscillating drive mechanism. Generally such devices comprise a spring actuated hammer mechanism or the like which is cocked and retained by a latch. The latch is released prior to the end of the forward stroke, causing the printing to occur before the reversal point of the drive mechanism is reached. The hammer is not recocked until later in the cycle and thus, although the latch is held released or is again released during the return stroke and before recocking takes place, a second printing is thereby obviated.

Although the foregoing and similar mechanisms are satisfactory, they generally require separate spring cocking and releasing mechanism trains which must operate at different times in order to effect actuation during the forward or return portion of the stroke only.

It therefore becomes the principal object of the present invention to provide an improved data imprinting control mechanism for a listing machine.

Another object is to provide a data imprinting control mechanism which necessitates only a single train of mechanism for properly operating such mechanism.

Another object is to simplify a data imprinting control mechanism for embodiment in an oscillating drive type machine.

The manner in which the above and other objects of the invention are accomplished will be readily understood on reference to the following specification when read in conjunction with the accompanying drawings, wherein:

Fig. 4 is a sectional side view illustrating the printer control mechanism in its position occupied in a full cycle condition of the machine.

Fig. 5 is a sectional side view illustrating parts of the rack drive mechanism.

Fig. 6 is a side view of the manually operable handle and its connection to the machine drive linkage.

Fig. 7 is a view similar to Fig. 4 with parts broken away and illustrating the printer control link at the upper extremity of its lost motion connection, this condition occurring when the handle is part way through its forward stroke.

Fig. 8 is a view similar to Fig. 7, illustrating the parts in a condition assumed after further advance of the handle and just prior to printing.

Fig. 9 is a view similar to Figs. 7 and 8, illustrating the parts in a condition assumed during the printing operation.

Figure 1:
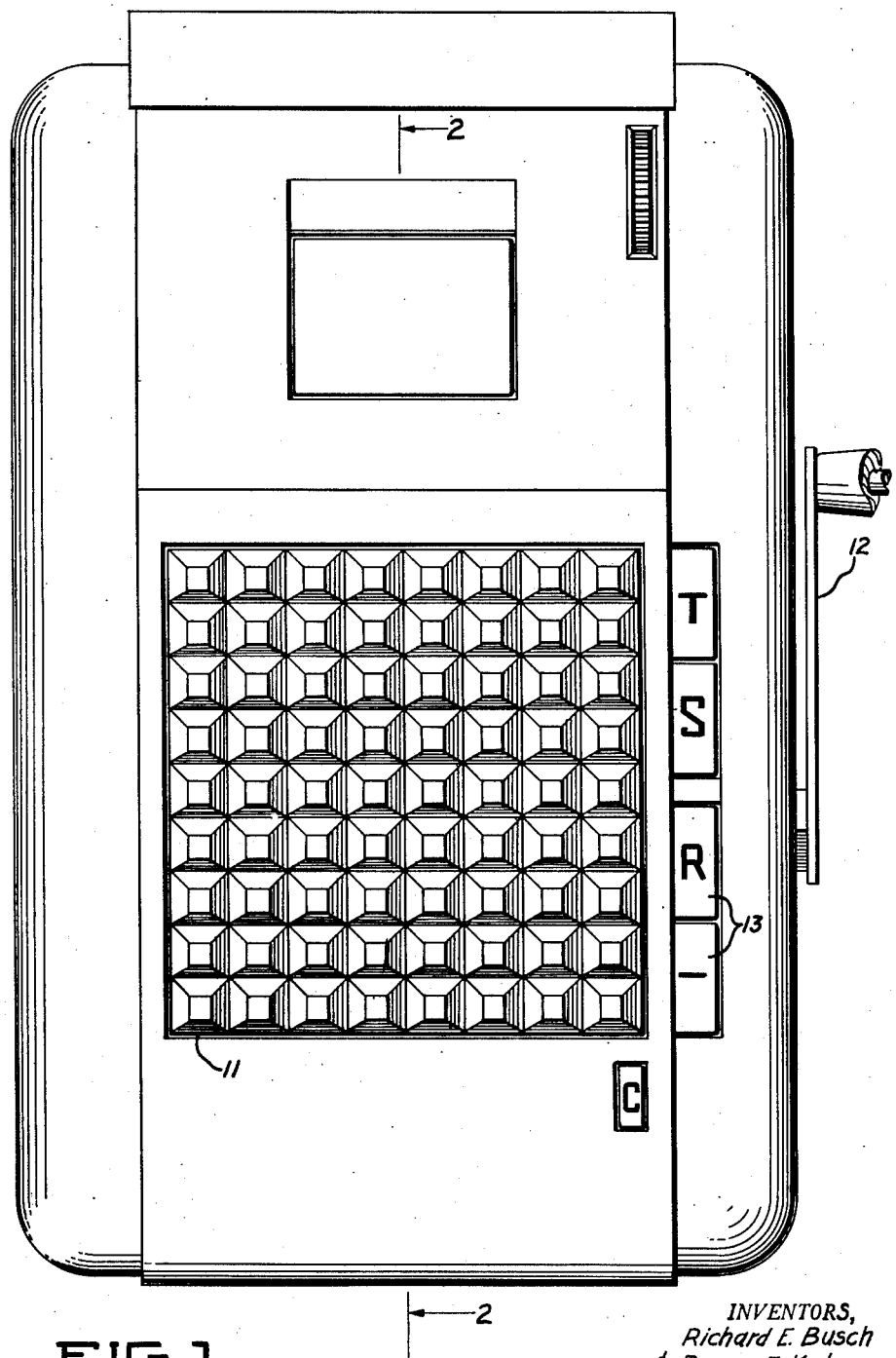
Fig. 1 is a plan view of an adding machine embodying a preferred form of the present invention.

This application is a division of the co-pending E. E. Bennett et al. application, Serial No. 334,632, filed on February 2, 1953, now Patent No. 2,744,682. Reference is hereby made to said co-pending application for a complete disclosure of a calculating machine in which the present invention is embodied. However, it is to be understood that the invention is equally well applicable to other types of machines capable of recording data on a record medium.

The machine disclosed is a hand operated adding-listing machine and comprises a keyboard embodying a plurality of rows of amount keys 11, progressing in value from 1 to 9 from the front of the machine. The machine is normally set to effect additive entries of the amount set up on the keyboard. This entry is accomplished by merely oscillating a drive handle 12.

Operations other than additive operations are effected by first depressing an appropriate one of a group of control keys 13 and thereafter oscillating the handle.

Amounts entered in the keyboard are transferred by drive racks 18.

Each amount key of the keyboard comprises a keytop 24 and a key stem 25, the latter being guided in aligned slots formed in a top plate 26 and a bottom plate 27. Spring means, not shown, are provided for normally retaining the keys in their illustrated raised positions.

Means are provided for locking the amount keys in their depressed positions wherein the lower ends of their stems are located to differentially limit the extent of movement of associated ones of the racks 18. For this purpose a locking bail 31 extends along the side of each row of keys and is pivotally supported in trunnion bearings 32 and 32a. The bail is pressed against the sides of the keys by a spring (not shown) and, as a depressed key reaches the bottom of its stroke, the bail is enabled to latch the same in depressed condition. The lower end of the key stem will then be located in the path of an associated shoulder 33 formed on the aligned rack.

A zero blocking lug 34 is carried by the bail 31 and, when no key of the associated row is depressed, the lug is located directly in front of one of the shoulders 33 preventing appreciable advance of the rack from its home position. However, when an amount key is depressed, the associated locking bail will be rocked to carry its lug 34 out of blocking position relative to the rack.

The handle 12 (Fig. 6) is rockable about the axis of its hub 133 and is secured to a bail 14, which is pivotally connected at 15 to a drive link 16. The latter forms a yieldable connection to an oscillating drive shaft 35 which is mounted in bearings (not shown) carried by the frame of the machine. For this purpose a drive pawl 17 is pivoted on the link 16 and is held in engagement with a roller 18 by a spring 36 tensioned between the pawl 17 and the drive link. Cooperating shoulders on the drive link and on the pawl are held in engagement with a roller 18 which is carried on a sector 37 keyed to the shaft 35.

Although the pawl 17 may yield under abnormal conditions of the machine, such as jamming, the roller 18 is normally held in engagement with the cooperating shoulders on the pawl 17 and drive links and, thus, a direct connection is normally effected between the handle and shaft 35.

Means are provided for yieldably transmitting a drive from the drive shaft 35 to the various racks 18 located in the different denominational orders of the machine. For this purpose, a cam 57 (Fig. 5) is keyed on the drive shaft 35 and is engaged by rollers 58 and 60 carried by a cam follower 61. The latter is pivoted on a stationary cross shaft 62 and is connected through a link 63 to a rack drive shaft 65. A cam and linkage (not shown) identical to the cam 57, etc., is provided on the opposite side of the machine to cause parallel fore and aft movement of the shaft 65 along guide slots, one of which is shown at 66 formed in machine frame plates 28.

Each of the racks 18 has an elongated slot 68 therein embracing the shaft 65 to support the forward end of the rack. A second slot 70 in each rack embraces the cross shaft 62 for guiding the rear end of the rack 18 during fore and aft movement thereof.

The slot 68 is provided with opposed notches 71 at its closed end and each notch is normally engaged by a roller 72 carried by a drive pawl 73. The pawls are pivotally mounted in pairs on the shaft 65 and are urged in opposite directions by a tension spring 74 whereby to form a yieldable connection between the drive shaft and the respective racks 18.

The various shoulders 33 on each rack 18 are spaced apart equal distances and such spacings are greater than the spacings between the stems of the various amount keys by an amount equal to the pitch of gear teeth 38 formed on the rack. Thus, when the rack is advanced toward the front of the machine, it will strike the lower end of the depressed key after it has advanced a number of increments or gear tooth spaces equal to the value of the depressed key.

As described in the aforementioned Bennett et al. application, means are provided whereby during item entry or totalling operations the accumulator 20 will be raised or lowered into mesh with gear rack sections on the racks 18 and will be rotated thereby during forward movement of the racks. The accumulator will normally be returned to its neutral illustrated position during return of the racks.

The printer mechanism 21 comprises a series of numeral type wheels 81, each entrained with respective ones of the racks 18. Each wheel has a series of type characters arranged around the periphery thereof and progressing in value from 0 to 9. These wheels are so entrained with the racks that they will be effective to print a digit corresponding to the value of a depressed key in the associated order.

Each numeral wheel is rotatably mounted on an individual arm 82, the latter being loosely keyed on a rockable printer control shaft 83. A spring 84 is tensioned between each arm 82 and a stationary cross piece 85 to urge each arm and wheel 81 toward the platen 23.

Each printing wheel 81 has integral therewith a gear 86 permanently meshed with an idler 87 also rotatably carried by the respective arm 82. Except during printing operations, the arms 82 are held against the action of their springs 84 and in their positions illustrated in Fig. 2 by the printer control shaft 83. In the latter positions of the arms, the idlers 87 are maintained in mesh with gears 88 independently and rotatably mounted on a stationary cross shaft 90. The gears 88 in turn directly mesh with rack gear sections 38 carried by the various racks 18.

The printer control shaft 83 (see also Figs. 4, 7, 8 and 9) is rocked clockwise to initiate a printing operation just before the operating handle 12 reaches the forward extremity of its stroke. For this purpose, the shaft 83 is secured to an arm 93 which is urged clockwise by a tension spring 94 extending between the arm and a frame pin 95.

A cam element 96 is pivoted at 97 to the arm 93 and has an arcuate edge or position 98 formed thereon and extending concentrically about the pivot 97. The edge 98 is normally held in rolling engagement with a flanged roller 100 rotatably mounted on a frame pin 101. In order to actuate the cam element 96, the latter is coupled through a lost motion connection to a printer control link 103. The lost motion connection comprises a pin 102a on cam 96 which is movable along the slot 102 in the link 103. The latter is pivoted at 104 to an arm 105 keyed on the drive shaft 35.

During forward advancement of the handle 12, counterclockwise from its home position shown in Fig. 6, the drive shaft 35 will likewise be rocked counter-clockwise, causing the cam 57 to advance the cam follower 61 and rack drive train. As the rack drive shaft advances to likewise advance the racks to positions controlled by depressed ones of the keys, the link 103 will first be raised to its position shown in Fig. 7 wherein the lower end of the slot 102 will engage the pin 102a. Continued forward movement of the handle will cause the link 103 to raise the camming element 96 about its pivot 97 from its position shown in Fig. 7 toward that shown in Fig. 8. Since the surface 98, in effect, forms a dwell portion, the arm 93 will be retained in its position shown in Fig. 4 during this movement of the camming element 96, thus holding the idlers 87 in mesh with gears 88 during the entire forward movement of the racks.

After the racks have been differentially advanced, and toward the end of the forward movement of the handle, a camming portion 106 formed on cam 96 and contiguous with the arcuate dwell portion 98 will move onto the roller 100 as the cam 96 passes beyond its position indicated at Fig. 8. Since the camming portion 106 is not concentric with the pivot 97, the spring 94 will become effective to snap the arm 93 clockwise, rocking the printer control shaft 83 and permitting the various springs 84 to move the printer type wheel carrying arms 82 clockwise, carrying the printer wheels 81 into printing contact with a printing ribbon 1057 and the paper tape 22. During this movement, the cam 96 is cammed sharply upward, being allowed to do so by the pin 102a as it moves idly along the slot 102 until the pin reaches the upper extremity of its movement relative to the slot, as shown in Fig. 9.

At the start of the return movement of the handle 12, and before the rack drive mechanism, including cam 57, has become effective to commence return of the racks from their forward advanced positions, the link 103 will be drawn downwardly by its arm 105, thereby immediately rocking the cam 96 downward about its pivot 97 and causing the camming portion 106 to cam along the roller 100. The resulting action will force the arm 93 and the shaft 83 counterclockwise toward their initial positions so as to return the various type wheel supporting arms 82 to positions where the idlers 87 will again mesh with gears 88. Thus, the various printer wheels 81 will be entrained with their respective racks 18 before the latter are returned to their home positions. At this point, the rack drive shaft 65 will start its return to likewise return the racks to their home positions. During such return movement, the dwell portion 98 of the cam 96 will move along the guide roller 100, maintaining the type wheels in entrainment with the racks until the handle has reached its normal illustrated position at which time the cam 96 will come to rest against a frame pin 108.

Means are provided to prevent printing of all zeros to the left of the highermost significant digit in a value being printed. For this purpose, a latch 110 is associated with each type wheel carrying arm 82, the latches being independently and pivotally mounted on a stationary cross rod 111. The latches are urged clockwise by tension springs 112 extending between the same and a crossrod 113. The latches are provided with ears 114 adapted to overlie and latch tails 115 formed on associated ones of the arms 82.

Normally, when the machine is in full cycle position and during forward and return movements of the racks 18, the various latches 110 are held out of locking engagement with the arms 82. For this purpose, the latches are provided with triangular openings 116 through which a bail rod 117 extends. The latter is carried by a lock bail 118, the arms of which are pivoted on a stationary cross-rod 119. A cross-piece 118' (Figs. 2 and 4) of the lock bail forms an aligner arranged to move between two adjacent teeth of each gear 88 during the printing stage of a machine cycle in order to lock the same in place.

The bail 118 is actuated by the drive shaft 35, and, for this purpose, it is connected through a link 120 to a cam arm 121. The latter is pivoted on the aforementioned shaft 62 and is provided with a crooked cam slot 124 therein, embracing a roller 125 carried on an arm 126. The latter is keyed on the shaft 35 and normally positions the roller 125 at the lower extremity of the slot 124 in which the cam arm is located to hold the locking bail 118 and the various latches 110 in their illustrated positions. However, after approximately 70° of forward movement of the hand crank, the roller 125 will ride over a hump 124' in the cam slot 124, causing the cam arm 121 to rock clockwise, drawing the locking bail 118 into its aligning position and allowing the latches 110 to move inwardly under the action of their respective springs 112 until ears 127 thereon limit against the inner edges of slots 128 formed in gears 88. Such inner edges are each formed of a lower step 130 and a raised step 131, both concentric about the shaft 90.

Figure 2:
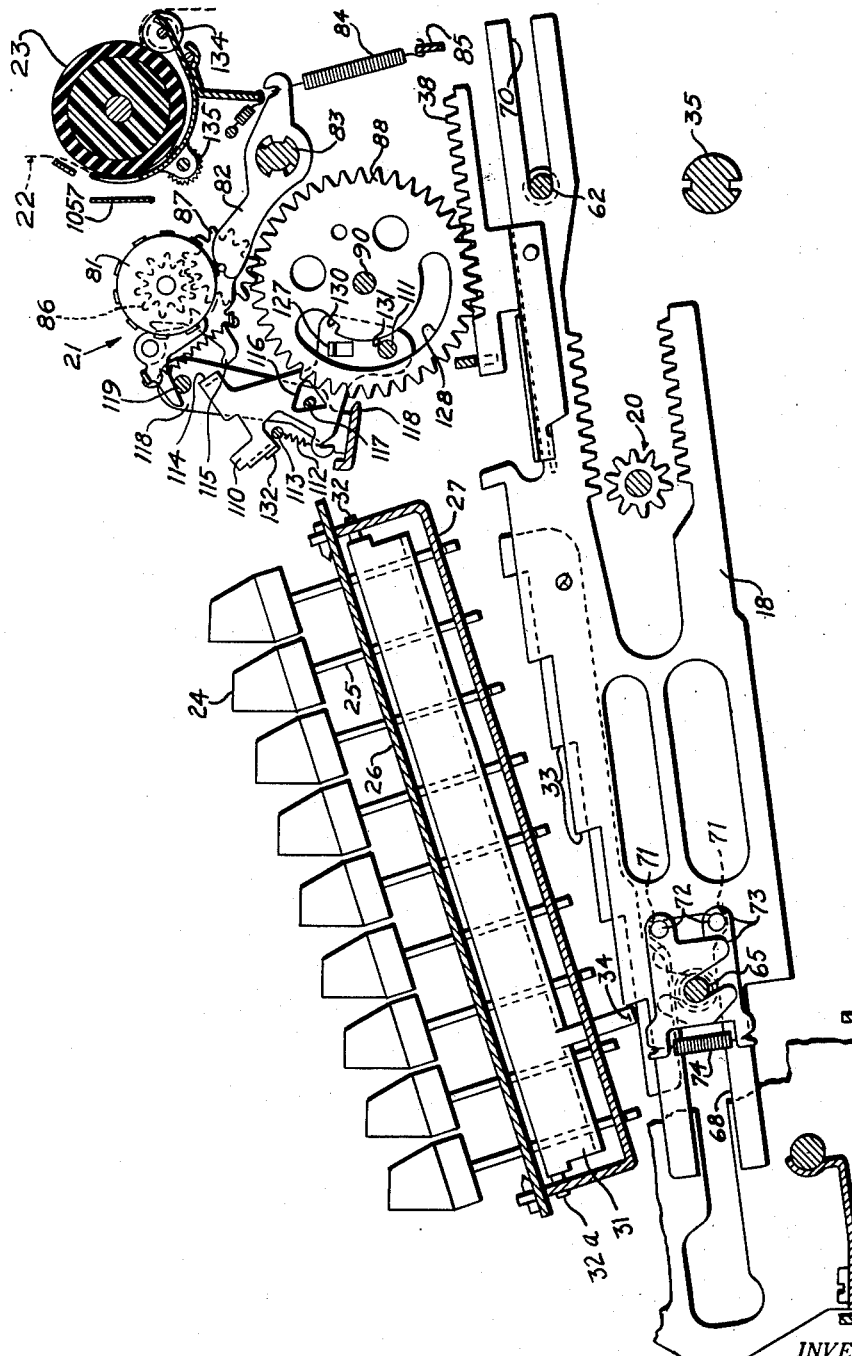
Fig. 2 is a longitudinal sectional view through the machine and is taken substantially along the line 2—2 of Fig. 1.

When a rack is located in its zero or initial position, as shown in Fig. 2, the lower step 130 will be located in registry with the ear 127 of the associated latch 110, thereby permitting the same to move to latching position just prior to the printing phase to prevent printing of zeros by its associated printing wheel 81. However, when a rack has moved to its one or other significant digital position, the raised step 131 of the associated gear 88 will be positioned under the ear 127 of the aligned latch, thereby preventing appreciable movement of the latch toward the latching tail 115 of the respective arm 82.

The various latches have laterally extending tails 132, each overlying the similar latch to the left so that when any latch is held in its outer illustrated position, it will hold all similar latches to the right thereof in such positions, thereby permitting printing of zeros in denominations located below, i. e., to the right of the highermost significant digit.

The paper tape 22 is carried around the platen 23 and is advanced one step or increment during the latter part of a machine cycle and after the printing phase occurs. For this purpose, the tape after passing from a suitable supply roll (not shown) is guided around the platen and is held in contact therewith by rollers 134 and 135.

Figure 3:
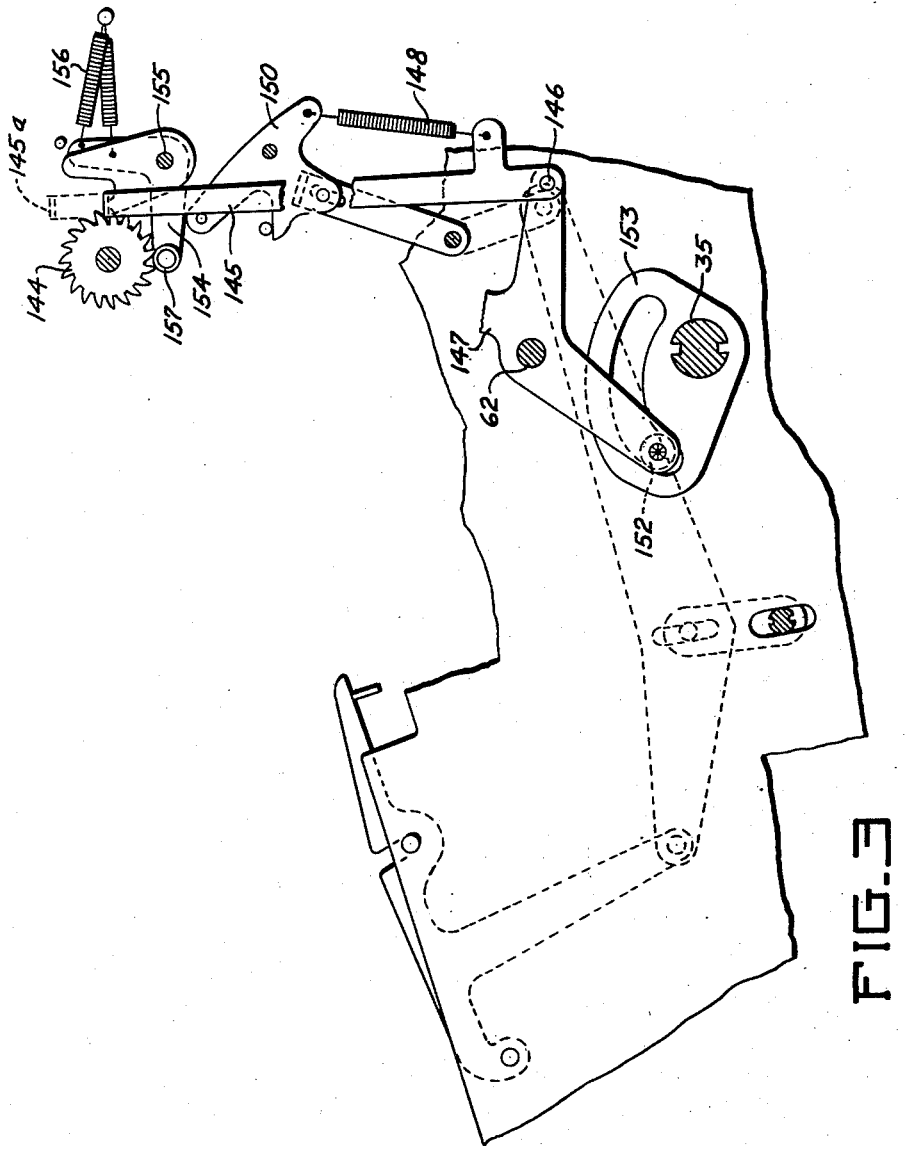
Fig. 3 is a sectional side view, taken along the left side of the machine, illustrating the platen advancing mechanism.

In order to intermittently advance the tape 22 during each cycle of the machine, a ratchet wheel 144, Fig. 3, is suitably secured to the platen 23 and is operable by a pawl 145. The latter is pivoted at 146 to a cam follower 147 and normally urged upwardly and to the left (in Fig. 3) by a tension spring 148. The latter is tensioned between the lower end of the pawl 145 and a lever 150 which, for the purpose of the present disclosure, may be considered as rigidly secured in its illustrated position.

The cam follower 147 is pivoted on the shaft 62 and is provided with a roller 152 which rides in a camming slot formed in a box cam 153 keyed on the drive shaft 35.

When the machine is in its full cycle or home position, the parts assume their positions illustrated in Fig. 3 wherein the pawl 145 is retained in engagement with the ratchet wheel 144. As the handle is operated through its stroke, the pawl 145 first moves upward to its dot-dash line position 145a and upon returning downwardly toward the end of the cycle it engages the ratchet wheel 144 to advance the same and thereby carry the paper tape upwardly, providing space for printing the next amount.

In order to yieldably hold the platen in different adjusted positions, a centralizer 154 is provided, being pivoted on a frame pin 155 and urged clockwise by a spring 156 to hold a roller 157 thereon in engagement between two teeth of the ratchet wheel 144.

Although we have described our invention in detail and therefore have used certain terms and languages herein, it is to be understood that the present specification is illustrative rather than restrictive, and that changes and modifications may be made without departing from the spirit or scope of the invention as set forth in the claims appended hereto.

Having thus described the invention, what we desire to secure by United States Letters Patent is:

1. In a calculating machine having a platen adapted to support a record medium, recording elements adapted to print data on said record medium, and spring means for actuating said recording elements; means for controlling said recording elements comprising the combination of a member operatively connected to said recording elements, stationarily located guide means, a cam engageable with said guide means, means forming a pivotal connection between said cam and said member, a second spring means for moving said member to permit operation of said first mentioned spring means, actuating means movable in opposite directions and including a lost motion connection for rocking said cam about said pivotal connection; said cam including a dwell portion effective upon engagement with said guide means to hold said member and said recording elements against the action of both of said spring means, said cam including a camming portion effective upon engagement with said guide means during movement of said actuating means in one direction to permit said second spring means to move said member relative to said actuating means to an extent permitted by said lost motion connection whereby to pemit said recording mechanism to print data on said record medium, said camming portion being effective during movement of said actuating mechanism in the opposite direction to move said member to restore said recording mechanism.

2. In a calculating machine having a platen adapted to support a record medium, recording elements adapted to print data on said record medium, and spring means for actuating said recording elements; means for controlling said recording elements comprising the combination of a member operatively connected to said recording elements, stationarily located guide means, a cam engageable with said guide means, means forming a pivotal connection between said cam and said member, actuating means movable in opposite directions and including a lost motion connection for rocking said cam about said pivotal connection, said cam including a dwell portion effective upon engagement with said guide means to hold said member and said recording elements against the action of said spring means, said cam including a camming portion effective upon engagement with said guide means during movement of said actuating means in one direction to permit said spring means to move said cam and said member relative to said actuating means and to an extent permitted by said lost motion connection whereby to cause said recording elements to print data on said recording medium, said camming portion being effective during movement of said actuating mechanism in the opposite direction to move said member to restore said recording mechanism.

3. In a calculating machine having recording mechanism for printing data on a record medium, and spring means for actuating said recording mechanism; means for controlling said recording mechanism comprising the combination of stationarily located guide means, a cam, means forming a pivotal connection between said cam and said recording mechanism, actuating means movable in opposite directions and including the lost motion connection for rocking said cam about said pivotal connection; said cam including a dwell portion effective upon engagement with said guide means to retain said recording mechanism from printing said data, said cam including a camming portion effective upon engagement with said guide means during movement of said actuating means in one direction to permit said spring means to move said recording mechanism relative to said actuating means and to an extent permitted by said lost motion connection whereby to print data on said recording medium, said camming portion being effective during movement of said actuating mechanism in the opposite direction to restore said recording mechanism.

4. In a calculating machine having a recording mechanism for printing data on a record medium, and spring means for actuating said recording mechanism; means for controlling said recording mechanism comprising the combination of a rockable member operatively connected to said recording mechanism, stationarily located guide means, a cam, means forming a pivotal connection between said cam and said member, a second spring means for moving said member to permit operation of said first mentioned spring means, an actuating device movable in opposite directions and including a lost motion connection for rocking said cam about said pivotal connection; said cam including a dwell portion effective upon engagement with said guide means to retain said member and said recording mechanism against the action of both of said spring means, said cam including a camming portion effective upon engagement with said guide means during movement of said actuating means in one direction to permit said second spring means to move said member relative to said actuating device and to an extent permitted by said lost motion connection whereby to enable said first mentioned spring to actuate said recording mechanism, said camming portion being effective during movement of said actuating mechanism in the opposite direction to move said member to restore said recording mechanism.

References Cited in the file of this patent

UNITED STATES PATENTS

| | | |
|---|---|---|
| 2,281,851 | Mehan | May 5, 1942 |
| 2,346,265 | Mehan | Apr. 11, 1944 |
| 2,361,260 | Buehler | Oct. 24, 1944 |
| 2,492,263 | Boyden | Dec. 27, 1949 |
| 2,562,049 | Lambert | July 24, 1951 |